United States Patent
Unger

(10) Patent No.: US 11,002,539 B2
(45) Date of Patent: May 11, 2021

(54) METHOD FOR DETECTING A SLOPE OF A ROAD

(71) Applicant: AUDI AG, Ingolstadt (DE)

(72) Inventor: Andreas Unger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 570 days.

(21) Appl. No.: 15/552,520

(22) PCT Filed: Jan. 15, 2016

(86) PCT No.: PCT/EP2016/000072
§ 371 (c)(1),
(2) Date: Nov. 14, 2017

(87) PCT Pub. No.: WO2016/134813
PCT Pub. Date: Sep. 1, 2016

(65) Prior Publication Data
US 2018/0156611 A1    Jun. 7, 2018

(30) Foreign Application Priority Data

Feb. 28, 2015    (DE) ..................... 10 2015 002 601.1

(51) Int. Cl.
*G01C 9/02*        (2006.01)
*B60G 17/0165*    (2006.01)
*B60G 17/019*    (2006.01)
*B60G 17/0195*    (2006.01)
*B60W 40/076*    (2012.01)
(Continued)

(52) U.S. Cl.
CPC ........... *G01C 9/02* (2013.01); *B60G 17/0165* (2013.01); *B60G 17/0195* (2013.01);
(Continued)

(58) Field of Classification Search
CPC ............ B60G 17/0155; B60G 17/0165; B60G 17/01908; B60G 17/0195; B60G 2400/82;
(Continued)

(56) References Cited

U.S. PATENT DOCUMENTS 8,170,726 B2    5/2012 Chen et al.
2002/0075140 A1*    6/2002 Yeh ....................... B60R 21/013
340/438
(Continued)

FOREIGN PATENT DOCUMENTS

DE    10327591 A1    1/2004
DE    10327593 A1    1/2004
(Continued)

OTHER PUBLICATIONS

Notification of Transmittal of Translation of the International Preliminary Report on Patentability dated Sep. 14, 2017, in connection with corresponding International Application No. PCT/EP2016/000072 (7 pages).

(Continued)

*Primary Examiner* — Kyle R Quigley
(74) *Attorney, Agent, or Firm* — Maier & Maier, PLLC

(57) ABSTRACT

A method for detecting a slope of a road on which a vehicle is traveling in at least one spatial direction. The vehicle has a body and a chassis with a plurality of wheels. An inclination of the vehicle body in the spatial direction is determined. For at least one wheel, a vertical distance to the vehicle body is detected. The distance so determined is used to calculate an inclination of the chassis in the spatial direction. The slope of the road in the spatial direction is determined from a difference between the inclination of the vehicle body in the spatial direction and the inclination of the chassis in the spatial direction.

8 Claims, 2 Drawing Sheets

(51) Int. Cl.
     *B60T 8/1755*   (2006.01)
     *B60T 8/172*    (2006.01)
     *B60T 8/24*     (2006.01)
     *B60G 17/015*   (2006.01)

(52) U.S. Cl.
     CPC ........ *B60G 17/01908* (2013.01); *B60T 8/172* (2013.01); *B60T 8/1755* (2013.01); *B60T 8/24* (2013.01); *B60W 40/076* (2013.01); *B60G 17/0155* (2013.01); *B60G 2400/82* (2013.01); *B60G 2800/019* (2013.01); *B60G 2800/702* (2013.01); *B60Q 2300/13* (2013.01); *B60T 2260/06* (2013.01); *B60W 2552/15* (2020.02)

(58) Field of Classification Search
     CPC ........ B60G 2800/019; B60G 2800/702; B60G 2400/0521; B60G 2400/0522; B60G 2400/0523; B60G 2400/104; B60G 2400/102; B60G 2400/106; B60G 2500/30; B60Q 2300/13; B60T 2260/06; B60T 8/172; B60T 8/1755; B60T 8/24; B60W 2520/10; B60W 2552/15; B60W 40/076; G01C 9/02
     See application file for complete search history.

(56)            References Cited

U.S. PATENT DOCUMENTS

2003/0236603 A1* 12/2003 Lu .................. B60G 17/016
                                                 701/37
2009/0326858 A1* 12/2009 Ueda ................. B60W 40/12
                                                 702/141
2014/0195112 A1*  7/2014 Lu ................... B60G 17/0165
                                                 701/37
2014/0309803 A1   10/2014 You et al.

FOREIGN PATENT DOCUMENTS

DE    102005046776 A1    4/2006
DE    102006026937 A1    1/2007
DE    102012216205 A1    3/2013
DE    102012024984 A1    7/2013
GB         2391327 A     2/2004
GB         2510417 A     8/2014
JP      2003097945 A     4/2003
JP      2009276109 A    11/2009

OTHER PUBLICATIONS

Examination Report dated Jan. 18, 2016 of corresponding German application No. 102015002601.1; 6 pgs.
International Search Report dated Apr. 19, 2016 of corresponding International application No. PCT/EP2016/000072; 14 pgs.
Written Opinion dated Apr. 19, 2016 of corresponding International application No. PCT/EP2016/000072; 12 pgs.
Office Action dated Nov. 3, 2020 in corresponding German Application No. 10 2015 002 601.1; 14 pages including partial machine-generated English-language translation.

* cited by examiner

METHOD FOR DETECTING A SLOPE OF A ROAD

FIELD

The invention relates to a method and a system for detecting a slope of a road.

BACKGROUND

The position of a vehicle changes during its travel in dependence on the slope or position of a road on which the vehicle is traveling. Angles for detecting the position of the vehicle can be detected by sensors.

One method for controlling a system of a vehicle is described in the publication DE 10 2006 026 937 A1. Here, a stability index is determined. Furthermore, a first and a second observer are provided, who, on the basis of operating variables of the vehicle, determine a reference lateral speed as well as a lateral speed, from which an initial lateral speed and an initial longitudinal speed are determined.

A method for determining a target curve slope of a vehicle when traveling on a curved section of road is known from the publication DE 10 2012 024 984 A1. In this case, the target curve slope of the vehicle is determined in dependence on a detected road curvature. Furthermore, an optical surface condition of the curved section of road is taken into account.

A method for the processing of sensor data in a vehicle is described in the publication DE 10 2012 216 205 A1, wherein driving dynamics data and chassis sensor data of the vehicle are detected and filtered.

SUMMARY OF THE DISCLOSURE

Given this background, a method and a system with the features of the independent patent claims are proposed. Embodiments of the method and the system will emerge from the dependent patent claims and the description.

The method according to the invention is provided for the detecting of a slope of a road on which a vehicle is traveling in at least one spatial direction, wherein the vehicle comprises a vehicle body and a chassis with a plurality of wheels, usually four, for its propulsion, which are in contact with the road. An inclination of the vehicle body in the at least one spatial direction is determined. Furthermore, for at least one wheel a vertical distance to the vehicle body is determined, wherein the at least one distance so determined is used to calculate an inclination of the chassis in the at least one spatial direction. The slope of the road in the at least one spatial direction is determined, usually calculated, from the difference between the inclination of the vehicle body in the at least one spatial direction and the inclination of the chassis in the at least one spatial direction.

The inclination of the vehicle body and of the chassis and the slope of the road are determined in dependence on at least one angle. As the at least one angle, a roll angle $\phi$ and/or a pitch angle $\theta$ is used. Each time the roll angle $\phi_a$ of the vehicle body, $\phi_f$ the chassis and $\phi_s$ of the road are to be taken into account as the roll angle $\phi$, and also each time the pitch angle $\theta_a$ of the vehicle body, $\theta_f$ of the chassis and $\theta_s$ of the road are to be considered as the pitch angle $\theta$.

In the embodiment, the inclination of the chassis in the at least one spatial direction is ascertained by transformation of the vertical distance of the at least one wheel to the vehicle body with a transformation matrix $$T = \begin{bmatrix} t_v & -t_v & t_h & -t_h \\ l_v & l_v & -l_h & -l_h \end{bmatrix}$$

whose elements are arranged in at least one column, for example, in four columns, and at least one row, for example two rows. Values for the elements of the transformation matrix are dependent on lengths $t_v$, $t_h$, $l_v$, $l_h$, usually side lengths, of the sides of at least one rectangle, wherein the center of gravity of the vehicle body is arranged at a first of two opposite corners of the at least one rectangle and the at least one wheel is arranged at a second of the two opposite corners, the values of the transformation matrix being dependent on a distance extending in a horizontal pane between the at least one wheel and the center of gravity of the vehicle body. It is provided in the embodiment that the lengths $t_v$, $t_h$, $l_v$, $l_h$ taken into consideration likewise lie in the horizontal plane.

Furthermore, the inclination of the chassis is determined by transformation of the distance $dz_{a,VL}$, $dz_{a,VR}$, $dz_{a,HL}$, $dz_{a,HR}$ of the at least one wheel, generally all four wheels, from the vehicle body in the vertical direction perpendicular to the horizontal with the transformation matrix.

In order to ascertain the inclination of the vehicle body, a first body-fixed coordinate system is used, and to ascertain the inclination of the chassis, a second chassis-fixed coordinate system is used. Furthermore, a third inertial coordinate system is used as a reference coordinate system, which is related to the force of gravity or the acceleration due to gravity $\vec{a}_{gv}$. In the design, the inclination of the vehicle body relative to the reference coordinate systems is described by way of a quaternion.

To carry out the method, a strapdown algorithm is used, with which it is provided that, in determining a corrected or adjusted acceleration $\vec{a}_{vp}$ of the vehicle in the horizontal plane, a sensor-measured acceleration a is corrected by a centrifugal acceleration $\vec{a}_{zf}$ and the gravitational acceleration $\vec{a}_{gv}$, and from this a velocity $\vec{v}_{plane}$ of the vehicle is determined in at least one spatial direction in the horizontal plane, and that the inclination of the vehicle body is calculated.

Furthermore, a value of a roll angles $\phi_s$ compared to a reference value provided for this purpose in order to describe a slope of the road in the transverse direction as the spatial direction, wherein it is determined that a steep curve is being traveled by the vehicle when the value is greater than the reference value.

The system or a corresponding arrangement according to the invention is intended for detecting a slope of a road on which a vehicle is traveling in at least one spatial direction. The vehicle, such as a motor vehicle, comprises a vehicle body and a chassis with a plurality of wheels, which are in contact with the road. The system comprises a plurality of sensors and a control unit, wherein at least one first sensor s designed to determine an inclination of the vehicle body in the at least one spatial direction. At least one second sensor is designed to detect or ascertain, for at least one wheel, a vertical distance to the vehicle body. The control unit is designed to calculate, from the at least one determined vertical distance, an inclination of the chassis in the at least one spatial direction, and to ascertain, usually to calculate, the slope of the road in the at least one spatial direction from a difference between the inclination of the vehicle body in the at least one spatial direction and the inclination of the chassis in the at least one spatial direction.

The at least one sensor is designed as a displacement sensor for measuring the distance.

The method among other things makes it possible to recognize the slope of a road on which the vehicle is traveling in the longitudinal and transverse direction. Furthermore, a steep curve can be recognized on the basis of the recognized slope of the road in the transverse direction.

The slope or position of the roadway, usually a road, is to be calculated from a sensor-determined inertial inclination or position of the body of the vehicle and an inclination or position of the chassis of the vehicle. In this case, the inclination between the vehicle body and the chassis is calculated via displacement sensors n order to detect distances, for example, by spring travel, between wheels as components of the chassis of the vehicle and the vehicle body, wherein the following equations or formulas (1) and (2) are taken into consideration:

$$\phi_s = \phi_a - \phi_f \quad (1)$$

(roll angle_road=roll angle_vehicle body−roll angle_chassis)

$$\theta_s = \theta_a - \theta_f \quad (2)$$

(pitch angle_road=pitch angle_vehicle body−pitch angle_chassis)

Here, the roll angle $\phi_s$ in the transverse direction of the road is used as an indicator for recognizing the steep curve.

In one embodiment of the method, four geometric variables or parameters are used, here, the distance extending in the horizontal plane between one of the wheels of the vehicle and the center of gravity of the vehicle, such distances not changing over the lifetime of the vehicle. Vertically oriented distances between the wheels and the vehicle body are ascertained during travel.

On the other hand, in other methods for the recognition of a steep curve or a slope, model-based relations are used with a large number of parameters which are particular to the individual vehicle change over the lifetime of the vehicle.

In another embodiment, a single-track model is used, which improves the quality of the estimation. This is also possible if the parameters of the single-track model are not known precisely or change over the lifetime of the vehicle, since these have but slight influence on the estimated variables being ascertained for an algorithm to be used in the method, for example for the strapdown algorithm.

Further advantages and embodiments of the invention will emerge from the description and the appended drawings.

Of course, the aforementioned features and those yet to be explained below may be used not only in the particular combination indicated, but also in other combinations or standing alone, without leaving the scope of the present invention.

Based on embodiments, the invention is shown schematically in the drawings and is described schematically and at length with reference to the drawings.

BRIEF DESCRIPTION OF THE DRAWINGS

The figures shall be described in interrelated and overlapping manner, the same reference numbers denoting the same components.

FIG. 1 shows schematically a vehicle 2 designed as a motor vehicle and a roadway 4 in the form of a road on which the vehicle 2 is traveling. The vehicle 2 comprises a vehicle body 6 and four wheels 8, 10 provided for the forward movement of the vehicle 2, of which only a left front wheel 8 and a left rear wheel 10 are shown in FIG. 1. Each wheel 8, 10 is connected at least by one spring 12, 14 to the vehicle body 6 and designed as a component of a chassis of the vehicle 2.

DETAILED DESCRIPTION OF THE DRAWINGS

Figure 1:
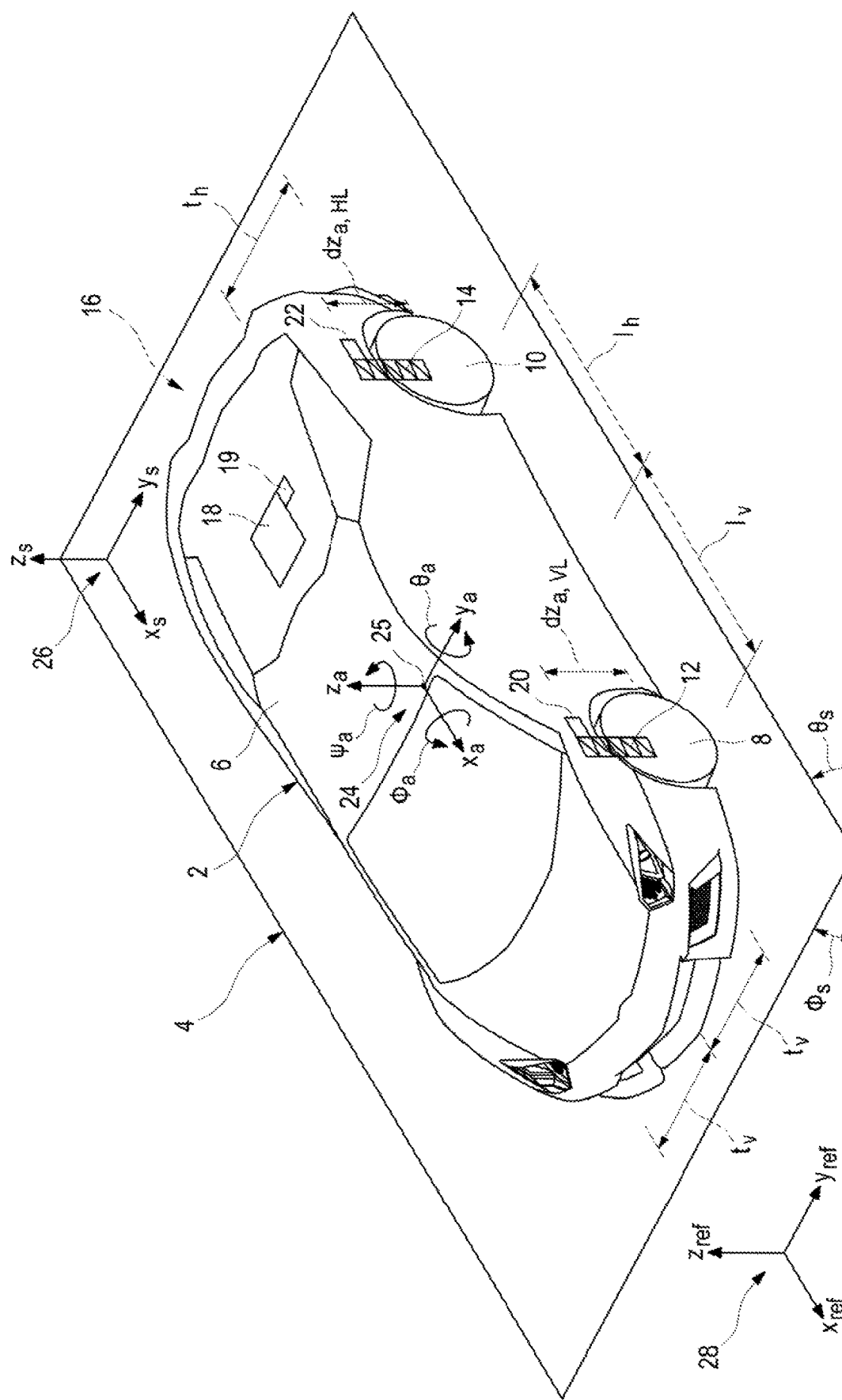
FIG. 1 shows in schematic representation an example of a vehicle with an embodiment of the system according to the invention.

The embodiment of the system 16 according to the invention encompasses, as its components, a control unit 18, at least one first sensor 19 for determining the inclination of the vehicle body 6 as well as a plurality of second sensors, designed here as displacement sensors 20, 22, each spring 12, 14 being coordinated with one such displacement sensor 20, 22. The at least one first sensor 19 and the displacement sensors 20, 22 are at the same time designed as components of a sensor layout of the system 16. Furthermore, the sensor layout and thus the system 16 encompass sensors, not further represented, for determining, generally for measuring, at least one kinetic variable, usually a speed and/or an acceleration of the vehicle 2 and/or the vehicle body 6.

Figure 2:
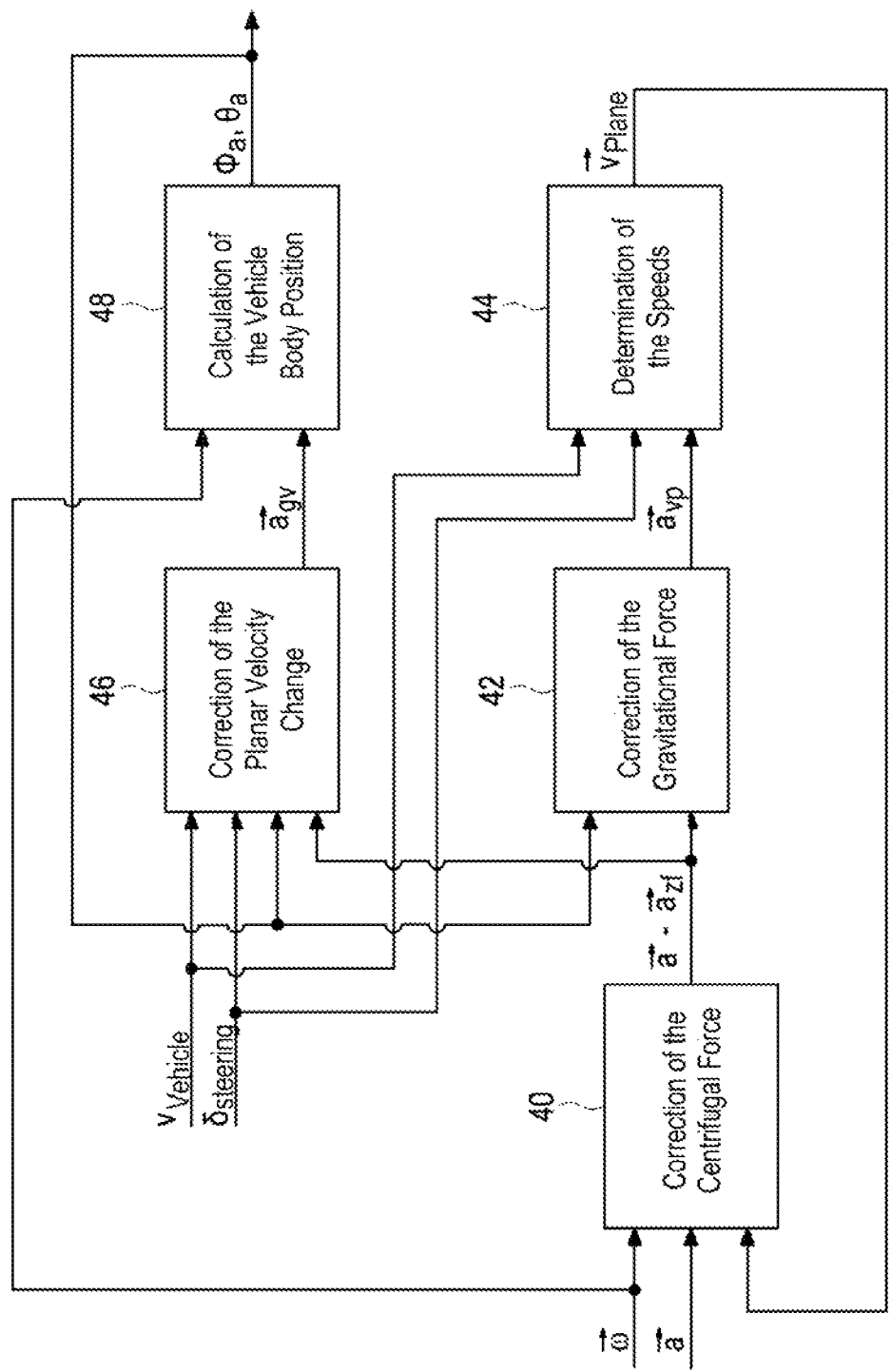
FIG. 2 shows a diagram for an embodiment of the method according to the invention.

The embodiment of the method of the invention described below with the aid of the diagram in FIG. 2 is to be carried out with the embodiment of the system 16 according to the invention shown schematically in FIG. 1, wherein steps of the embodiment of the method are to be controlled and thus controlled and/or regulated by the control unit 18.

Furthermore, three coordinate systems 24, 26, 28 as well as various parameters thereof, here geometrical parameters, are shown in FIG. 1.

The first, body-fixed coordinate system 24 is coordinated with the vehicle body 6 of the vehicle 2, its origin being situated at the center of gravity 25 of the vehicle body 6. The first coordinate system 24 comprises a first axis in the spatial direction $x_a$, which is oriented longitudinally to its vehicle body 6 and parallel to a traveling direction of the vehicle 2. A second axis is oriented in the spatial direction $y_a$, transversely to the vehicle body 6 and parallel to the axles of the vehicle 2, which extend between two wheels 8, 10 of the vehicle 2. A third axis is oriented in the spatial direction $z_a$ parallel to a vertical axis of the vehicle body 6. All three mentioned axes and thus spatial directions $x_a$, $y_a$, $z_a$ are oriented perpendicular to each other. It is provided in the embodiment that the first two axes mentioned and thus the spatial directions $x_a$ and $y_a$ subtend a horizontal plane of the vehicle 2, in which the center of gravity 25 lies.

Furthermore, FIG. 1 shows two examples of vertically oriented distances $dz_{a,VL}$, $dz_{a,HL}$ designed as spring travel paths. A first distance $dz_{a,VL}$ pertains to a distance between the left front wheel 8 and the vehicle body 6. A second distance $dz_{a,HL}$ pertains to a distance between the left rear wheel 10 and the vehicle body 6. These spring travel paths or distances $dz_{a,VL}$, $dz_{a,HL}$ are oriented along the springs 12, 14 and are to be detected by the displacement sensors 20, 22 coordinated with the springs 12, 14.

Distances of the wheels 8, 10 from the center of gravity 25 of the vehicle body 6 in a plane parallel to the horizontal plane are to be defined here by the lengths or side lengths or stretches $t_v$, $t_h$, $l_h$, $l_v$. For the left front wheel 8, one must take into account a front transverse stretch $t_v$, describing the distance of the wheel 8 from the center of gravity 25 in the transverse spatial direction, and a front longitudinal stretch $l_v$, describing the distance of the wheel 8 from the center of gravity 25 in the longitudinal spatial direction. For the left rear wheel 10, one must take into account a rear transverse stretch $t_h$, describing the distance of the wheel 10 from the center of gravity 25 in the transverse spatial direction, and a rear longitudinal stretch $l_h$, describing the distance of the wheel 10 from the center of gravity 25 in the longitudinal spatial direction.

Another spring travel or another vertically oriented distance $dz_{a,VR}$ pertains to a distance between a right front wheel, not shown here, and the vehicle body 6. An additional spring travel or an additional distance $dz_{a,HR}$ in the vertical direction pertains to a distance between a right rear wheel, not shown here, and the vehicle body 6. The described distances $dz_{a,VL}$, $dz_{a,HL}$, $dz_{a,VR}$, $dz_{a,HR}$ or spacings between the wheels 8, 10 and the vehicle body 6 are referred in the embodiment to the horizontal plane in which the center of gravity 25 lies.

Furthermore, for the right front wheel, one must take into account the front transverse stretch $t_v$, describing the distance of the right front wheel from the center of gravity 25 in the transverse spatial direction, and the front longitudinal stretch $l_v$, describing the distance of the right front wheel from the center of gravity 25 in the longitudinal spatial direction. For the right rear wheel, one must take into account the rear transverse stretch $t_h$, describing the distance of this wheel from the center of gravity 25 in the transverse spatial direction, and the rear longitudinal stretch $l_h$, describing the distance of the right rear wheel from the center of gravity 25 in the longitudinal spatial direction, the rear transverse stretch to be taken into account for the right rear wheel not being indicated in FIG. 1.

A second, chassis-fixed coordinate system 26 is coordinated with the road 4 and comprises a first axis in the spatial direction $x_s$ parallel to a specified traveling direction or longitudinal direction of the road 4, a second axis in the spatial direction $y_s$, oriented parallel to a transverse direction of the road 4, and a third axis in the spatial direction $z_s$, all these axes being oriented perpendicular to each other. A slope and thus a position of the road 4 is described here by means of a transverse angle or roll angle $\phi_s$, describing a slope of the road 4 in the transverse direction, and by means of a longitudinal angle or pitch angle $\theta_s$, describing a slope of the road 4 in the longitudinal direction and thus a grade or gradient.

A third coordinate system 28 is designed as a reference coordinate system and comprises a first axis in the spatial direction $x_{ref}$, a second axis in the spatial direction $y_{ref}$ and a third axis in the spatial direction $z_{ref}$, all of them oriented perpendicular to each other.

Furthermore, there are shown for the first coordinate system 24 a roll angle $\phi_a$, which describes a rotation of the vehicle body 6 about the first axis, oriented in the spatial direction $x_a$, a pitch angle $\theta_a$, which describes a rotation of the vehicle body 6 about the second axis, oriented in the spatial direction $y_a$, and a yaw angle $\psi_a$, which describes a rotation of the vehicle body 6 about a third axis, oriented in the spatial direction $z_a$.

The first, body-fixed coordinate system 24 [$x_a$, $y_a$, $z_a$] at the center of gravity 25 of the vehicle body 6 of the vehicle 2 follows translatory and rotational movements of the vehicle body 6. The third, inertial coordinate system 28 [$x_{ref}$, $y_{ref}$, $z_{ref}$] is used as a reference coordinate system, taking into account that the gravitational acceleration g acts solely in the spatial direction $z_{ref}$ parallel to a gravitation vector.

In the embodiment of the method, in order to estimate an inclination or position of the vehicle body 6, the pitch $\theta_a$ and the roll angle $\phi_a$ are referred to the third coordinate system 28, configured as the reference coordinate system.

The angles [$\theta_a$, $\phi_a$, $\psi_a$] are also designated as the inertial pitch angle $\theta_a$, inertial roll angle $\phi_a$ and inertial yaw angle $\psi_a$. By the inclination of the vehicle body 6 is meant its orientation in the pitch direction and roll direction, from which the pitch angle $\theta_a$ and the roll angle $\phi_a$ are determined.

In order to estimate the inclination or position of the vehicle body 6, the acceleration $\vec{a}=[\ddot{x}_a, \ddot{y}_a, \ddot{z}_a]^T$ of the vehicle body 6 and of the vehicle 2 along the spatial directions $x_a$, $y_a$, $z_a$ and the rates of rotation $\vec{\omega}=[\dot{\psi}_a, \dot{\phi}_a, \dot{\theta}_a]^T$ are measured and thus ascertained with the sensor layout for determining the inertia with six degrees of freedom (IMU—Inertial Measurement Unit), while the sensor layout can also be used independently of the performance of the method in the vehicle 2.

To estimate the inclination of the vehicle body 6, one first considers the physical boundary conditions to which the variables $\vec{a}$ and $\vec{\omega}$ are subjected, which are to be ascertained by the sensor layout, for example by measurement. From measurement signals of acceleration sensors of the sensor layout, three different physical variables are deduced:

the centrifugal acceleration $\vec{a}_{zf}$, dependent on the rates of rotation $\vec{\omega}$ and the planar velocity $\vec{v}_{plane}=[v_{Plane,x}, v_{Plane,y}, v_{Plane,z}]^T$ of the vehicle 2:

$$\vec{a}_{zf} = \vec{\omega} \times \vec{v}_{Plane} \quad (3)$$

the change in the adjusted, planar velocity $\vec{v}_{Plane}$ and thus acceleration $\vec{a}_{vp}$ of the vehicle 2 and/or the vehicle body 6 in the spatial direction of one axis of a respective acceleration sensor in the horizontal plane of the vehicle:

$$\vec{a}_{vp} = R\dot{\vec{v}}_{Plane} \quad (4)$$

the gravitational acceleration $\vec{a}_{gv} = R[0,0,-g]^T \quad (5)$

In the formulas $\vec{v}_{Plane}$ is the velocity of the vehicle 2 in the horizontal plane and R is the Euler rotation matrix (6), which is calculated taking into account the Euler angle in a rotation sequence of the roll angle $\phi$, the pitch angle $\theta$ and the yaw angle $\psi$. Here, $v_{plane,x}$ is the usual velocity of the vehicle $v_{vehicle}$ in the longitudinal or traveling direction of the vehicle 2, which is measured in terms of the rotary speed of the wheels 8, 10 and indicated on the tachometer.

$$R = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\cos\psi - \sin\phi\cos\psi & \cos\phi\cos\theta \end{pmatrix} \quad (6)$$

The respectively determined angles $\phi$, i.e., $\phi_a$ (for the vehicle body), $\phi_f$ (for the chassis) and $\phi_s$ (for the road), and $\theta_s$ i.e., $\theta_a$ (for the vehicle body), $\theta_f$ (for the chassis) and $\theta_s$ (for the road), can usually be ascertained by two different computational methods or calculation approaches:

by temporal integration of the rates of rotation $\vec{\omega}$, measured by the sensor layout, or by eliminating the centrifugal acceleration $\vec{a}_{zf}$ and the change in the planar velocity $\vec{v}_{Plane}$ and thus the acceleration $\vec{a}_{vp}$ of the vehicle 2 from the accelerations $\vec{a}_{gv} = \vec{a} - \vec{a}_{zf} - \vec{a}_{vp}$ measured by the sensor layout and calculating the angles through trigonometric functions $$\theta_a = a\tan\frac{a_{gv,x}}{a_{gv,z}},$$

$$\phi_a = a\tan\frac{a_{gv,y}}{a_{gv,z}}.$$

As already indicated by means of equation (5), $\vec{a}_{gv}$ is a vector with the three elements $[a_{gv,x}, a_{gv,y}, a_{gv,z}]^T = [g*\sin\theta, -g*\sin\phi*\cos\theta, -g*\cos\phi*\cos\theta]^T$, whereas the acceleration of earth g=9.81 m/s² is used here as a scalar, which acts depending on the inclination of the vehicle body 6, as described by the Euler rotation matrix R (6), on different elements of the vector $\vec{a}_{gv}$. If the vehicle body 6 is not inclined, then $\vec{a}_{gv}=[0,0,-g]^T$. For a roll angle $\phi_a=90°$ and a pitch angle $\theta_a=0°$, $\vec{a}_{gv}=[0,-g,0]^T$. If $\vec{a}_{gv}$ is known, the pitch angle $\theta_a$ and the mil angle $\phi_a$ can be computed through the above-described a tan functions.

However, it must be taken into account in the computations that, because of time-variable offset errors of rotational rate sensors, an integration of the rotational rates in stationary manner may be inaccurate. This means that calculated angles show low frequency drift and only high-frequency components of measurement signals are usable. For the angles ascertained by acceleration sensors, on the other hand, high-frequency perturbations are to be expected, since hard to detect changes in the velocity cannot be eliminated from the measurement signals such as occur when traveling over potholes.

In the embodiment described here, an inclination filter or position filter based on quaternions is used as a filter algorithm. It is likewise possible to employ a Kalman filter for the merging of both computational methods. In this way, both of the above indicated computational methods are combined, so that a signal is provided which is usable both at low frequency and high frequency.

A quaternion is a four-dimensional vector $\vec{q}=[q_1, q_2, q_3, q_4]^T$, which can be used to describe the orientation of a rigid vehicle body, here, the vehicle body 6. If a rigid vehicle body is rotated in regard to a reference system by the angle $\chi$ and the axis $\vec{r}=[r_x, r_y, r_z]^T$, where $\vec{r}$ is a unitary vector, this orientation in regard to the reference system is described by the quaternion $$\vec{q} = \left[\cos\frac{x}{2}, -r_x\sin\frac{x}{2}, -r_y\sin\frac{x}{2}, -r_x\sin\frac{x}{2}\right]^T.$$

This is used first of all the temporal integration of the rates of rotation $\vec{\omega}$ measured by the sensor layout, the vehicle body 6 in the present case being rotated in regard to the inertial reference system with the rate of rotation $\vec{\omega}=[\omega_x, \omega_y, \omega_z]^T$. Starting from an initial position $\vec{q}_1$ of the vehicle body 6, the change in position or inclination on account of the rates of rotation is described by the equation (7):

$$\dot{\vec{q}}_\omega = \frac{1}{2}\vec{q}_L \otimes [0, \omega_x, \omega_y, \omega_z] \qquad (7)$$

The operator $\otimes$ here symbolizes a quaternion multiplication in a time-discrete case, a resulting differential equation can be solved, e.g., by a Euler integration (8):

$$\vec{q}_{\omega,k} = \vec{q}_{L,k-1} + \dot{\vec{q}}_\omega \Delta t \qquad (8)$$

where $\Delta t$ corresponds to a time increment between two moments of time k and k−1.

In order to describe with quaternions an orientation of the vehicle body 6 from the acceleration $\vec{a}$ measured by the sensor layout and the resulting, adjusted gravitational acceleration $$\vec{a}_{gv}=[a_{gv,x}, a_{gv,y}, a_{gv,z}]^T = [g*\sin\theta, -g*\sin\phi*\cos\theta, -g*\cos\phi*\cos\theta]^T$$

the following optimization problem (9) needs to be solved:
There $$\vec{q}_a = \min_{q_L \in \mathcal{R}^{-1}} \vec{f}(\vec{q}_L, \vec{a}_{gv}) \qquad (9)$$

$$mit\, \vec{f}(\vec{q}_L, \vec{a}_{gv}) = \begin{bmatrix} 2(q_{L,2}q_{a,4} - q_{L,1}q_{L,3}) - a_{gv,x} \\ 2(q_{L,1}q_{L,2} + q_{L,3}q_{L,4}) - a_{gv,y} \\ 2(0.5 - q_{L,2}^2 - q_{L,3}^2) - a_{gv,z} \end{bmatrix}$$

[mit = with]

A direct calculation of the inclination is not possible, since infinitely many solutions exist about an axis of rotation which is oriented parallel to the gravitation vector. For the time-discrete solution of the optimization problem, a gradient-based approach (10) with en adjustable increment $\mu$ is used:

$$\vec{q}_{a,k} = \vec{q}_{L,k-1} = \mu \frac{\nabla \vec{f}(\vec{q}_{L,k-1}, \vec{a}_{gv})}{\|\nabla \vec{f}(\vec{q}_{L,k-1}, \vec{a}_{gv})\|} \qquad (10)$$

In order to merge information about the inclination resulting from the measured rates of rotation $\vec{q}_{\omega,k}$ and from the accelerations $\vec{q}_{a,k}$, the two quaternions $\vec{q}_{a,k}$, $\vec{q}_{L,k}$ are added with weighting by equation (11):

$$\vec{q}_{L,k} = \gamma \vec{q}_{a,k} + (1-\gamma)\vec{q}_{\omega,k} \qquad (11)$$

where $0 \leq \gamma \leq 1$ is an adjustable parameter. The pitch angle and roll angle are then computed with the equations (12a), (12b):

$$\theta_{a,k} = -\sin^{-1}(2q_{L,k,2}q_{L,k,4} + q_{L,k,1}q_{L,k,3}) \qquad (12a)$$

$$\Phi_{a,k} = a\tan\left(\frac{2q_{L,k,2}q_{L,k,4} + 2q_{L,k,1}q_{L,k,3}}{2q_{L,k,1}^2 + 2q_{L,k,4}^2 - 1}\right) \qquad (12b)$$

In order to eliminate the centrifugal acceleration $\vec{a}_{zf}$ and the change $\vec{a}_{vp}$ in the planar velocity $\vec{v}_{Plane}$ from the accelerations measured by the sensor layout, the pitch and roll angle need to be taken into account, which in turn are computed with the aid of the gravitational acceleration vector $\vec{a}_{gv}$.

To carry out the embodiment of the method, a so-called strapdown approach is used, as represented in the diagram of FIG. 2. Individual steps 40, 42, 44, 46, 48 of the method shall be described more closely below.

At the start of the method, sensor-determined values are provided for the acceleration $\vec{a}$ and the rate of rotation $\vec{\omega}$. With these values, in a first step 40, a "correction of the centrifugal force" is carried out, wherein the accelerations measured by the sensor layout are corrected by the component of the centrifugal force $\vec{a}_{zf} = \vec{\omega} \times \vec{v}_{Plane}$. A first corrected acceleration $\vec{a} - \vec{a}_{zf}$ is determined. This first corrected acceleration $\vec{a} - \vec{a}_{zf}$ is corrected in a second step 42, taking into account values for the roll angle $\phi_a$ and the pitch angle $\theta_a$, by the gravitational acceleration $\vec{a}_{gv}$, performing a "correction of the gravitational force", resulting in the acceleration $\vec{a}_{vp}$ in the horizontal plane.

In the context of the method, two options are provided for calculating the planar velocity $\vec{v}_{Plane}$.

A "determination of the velocities" is carried out in a third step 44, taking into account the acceleration $\vec{a}_{vp}$ of the vehicle 2, the measured velocity v of the vehicle 2 and its steering angle $\delta_{steer}$, wherein the first planar velocity of the vehicle $\vec{v}_{Int} = [v_{Int,x}, v_{Int,y}, v_{Int,z}]^T$ is calculated by integration (13):

$$\vec{v}_{Int} = \int \vec{a}_{vp} dt \qquad (13)$$

of the acceleration $\vec{a}_{vp}$ of the vehicle 2 and thus determined. This planar velocity $\vec{v}_{Int}$ in turn is used in a closed feedback control circuit for the "correction of the centrifugal force" in the first step 40.

For the velocity $v_{plane,x}$ in the spatial direction of a longitudinal axis of the vehicle 2, we may use the velocity $v_{vehicle}$ in the direction $x_a$ of the vehicle 2 as measured by the rotary speed of the wheels. With the aid of a single-track model, it is furthermore possible to calculate an effective velocity $v_{y,ESM}$ for the transverse axis of the motor vehicle from the steering angle $\delta_{steer}$ and the measured velocity $v_{vehicle}$. For the vertical velocity $v_{plane,z}$ no other measurement or calculation method is available. The alternatively determined second planar velocity of the vehicle (14):

$$\vec{v}_{alt} = [v_{Vehicle}, v_{y,ESM}, 0]^T \qquad (14)$$

and the velocity $\vec{v}_{Int}$ calculated by integration (13) can be merged by a suitable filter algorithm, such as a Kalman filter (15), by a computational procedure including a weighting factor $\tau$:

$$\vec{v}_{Plane} = \tau \vec{v}_{Int} + (1-\tau) \vec{v}_{alt} \text{ with } 0 \leq \tau \leq 1 \qquad (15)$$

In a fourth step 46 for the "correction of the planar velocity change", values of the measured velocity $v_{vehicle}$, the steering angle $\delta_{steer}$, the angles $\theta_a$, $\phi_a$ and the acceleration $\vec{a} - \vec{a}_{zf}$ corrected by the centrifugal acceleration $\vec{a}_{zf}$ are taken into account, the corrected acceleration being corrected by the component of the change in the planar velocity $\vec{a}_{vp,alt} = R \vec{v}_{alt}$. In order to avoid a negative feedback, the derivation of a vector of the velocity $\vec{v}_{alt}$ is used instead of the velocity $\vec{v}_{Plane}$ determined according to the computational procedure (15).

In a fifth step 48, taking into account the rate of rotation $\vec{\omega}$ and the gravitational acceleration $\vec{a}_{gv}$ of the vehicle 2, the pitch angle $\theta_a$ as well as the roll angle $\phi_a$ and thus the inclination or position of the vehicle body 6 of the vehicle 2 are calculated with the above-described quaternion-based inclination filter. With the above-described procedure, the pitch angle $\theta_a$ and the roll angle $\phi_a$ are determined in terms of the inertial coordinate system 28 and used in a closed feedback control circuit for the "correction of the gravitational force" in the second step 42 and for the "correction of the planer velocity change" in the third step.

Starting from the inclination of the vehicle body 6 as determined in the fifth step 48, the slope and thus the position of the road 4 is determined, wherein the distances $\vec{dz}_a = [dz_{a,VL}, dz_{a,VR}, dz_{a,HL}, dz_{a,HR}]^T$ between the wheels 8, 10 and the vehicle body 6 are used as measured variables, thus calculating at first the pitch angle $\theta_f$ and the roll angle $\phi_f$ of the chassis of the vehicle 2, the calculation being carried out in dependence one transformation matrix (18):

$$T = \begin{bmatrix} t_v & -t_v & t_h & -t_h \\ l_v & l_v & -l_h & -l_h \end{bmatrix} \qquad (16)$$

with which a geometrical position of the center of gravity 25 is described in terms of the positions of the wheels 8, 10. The first column here describes the distance of the left front wheel 8, the second column the distance of the right front wheel, the third column the distance of the left rear wheel 10 and the fourth column the distance of the right rear wheel from the center of gravity 25 within the horizontal plane.

The inclination of the chassis is then determined through the vectorial relation (17):

$$\begin{bmatrix} \phi_f \\ \theta_f \end{bmatrix} = T \vec{dz}_a \qquad (17)$$

By subtracting the inclination of the chassis from the inclination of the vehicle body 6, the slope of the road 4 is calculated in relation to the body-fixed first coordinate system 24 through the vectorial relation (18):

$$\begin{bmatrix} \phi_a \\ \theta_a \end{bmatrix} = \begin{bmatrix} \phi_a \\ \theta_a \end{bmatrix} - \begin{bmatrix} \phi_f \\ \theta_f \end{bmatrix} \qquad (18)$$

Since a tire deflection of the wheels 8, 10 is very slight as compared to a spring travel and thus the distance to be taken into account, this is disregarded in the above calculation.

Since the angles $\phi_a$ and $\theta_a$ are vector-related estimated variables for the inclination of the vehicle body 6 and $\phi_f$ and $\theta_f$ describe the relative angles between the vehicle body 6 and the surface of the road 4, with $\phi_s$ and $\theta_s$ we likewise have angles available as estimated variables for the slope of the road 4 or road in terms of the gravitational vector.

In a further embodiment, the method can recognize among other things a steep curve being traveled, involving a curve banked toward an inner side of the vehicle 2, which is used for example at race courses in order to increase the velocity on the curve. Certain feedback control algorithms, however, are not adapted for travel on steep curves, so that a recognition of such curves should be provided.

The above described roll angle $\phi_s$, ascertained by estimation, indicates how much the road 4 is inclined in the transverse direction of the vehicle 2. If the estimated variable is compared to a threshold value, an indicator (19)

$$I_{steep\ curve} = \begin{cases} 1, & \text{if}\ |\phi_n| \geq \theta_{min,steep\ curve} \\ 0 & \text{otherwise} \end{cases} \quad (19)$$

is provided, which takes on the value 1 as soon as the roll angle $\phi_s$ has fallen below a reference value $\phi_{min,steep\ curve}$ for the slope of the road 4 in the transverse direction. Furthermore, a feedback control strategy should be adapted to this situation for a chassis stabilization system affected by the steep curve. For example, a leveling control of an air suspension system should be disabled for the duration of traveling along the steep curve, so as not to respond to the increased acceleration in the z spatial direction, only occurring on the steep curve.

The invention claimed is:

1. A method for detecting a slope of a road on which a vehicle is traveling in at least one spatial direction, comprising:
    a vehicle body and a chassis with a plurality of wheels, which are in contact with the road, wherein an inclination of the vehicle body in the at least one spatial direction is determined, wherein for at least one wheel, a vertical distance to the vehicle body is detected, wherein the at least one distance so determined is used to calculate an inclination of the chassis in the at least one spatial direction, and wherein the slope of the road in the at least one spatial direction is determined from a difference between the inclination of the vehicle body in the at least one spatial direction and the inclination of the chassis in the at least one spatial direction, wherein the inclination of the chassis in the at least one spatial direction is determined by transformation of the vertical distance of the at least one wheel to the vehicle body with a transformation matrix:

$$T = \begin{bmatrix} t_v & -t_v & t_h & -t_h \\ l_v & l_v & -l_h & -l_h \end{bmatrix}$$

whose elements are arranged in at least one column and at least one row, wherein values for the elements of the transformation matrix are dependent on lengths $t_v$, $t_h$, $l_v$, $l_h$ of the sides of at least one rectangle, wherein the center of gravity of the vehicle body is arranged at a first of two opposite corners of the at least one rectangle and the at least one wheel is arranged at a second one of the two opposite corners,
    wherein a body-fixed coordinate system is used to ascertain the inclination of the vehicle body, a chassis-fixed coordinate system is used to ascertain the inclination of the vehicle chassis, and an inertial coordinate system is used as a reference coordinate system,
    wherein the inclination of the vehicle body relative to the reference coordinate system is described by a quaternion, and
    wherein a filter algorithm configured to merge computational methods is used to provide a signal usable both at low frequency and high frequency,
    the method comprising providing sensor determined values for acceleration and rate of rotation,
    performing a correction of the centrifugal force, wherein accelerations measured by the sensor layout are corrected by a component of the centrifugal force to determine a first corrected acceleration,
    performing a correction of the gravitational force, wherein the first corrected acceleration is corrected, taking into account roll angle and pitch angle, by the gravitational acceleration, resulting in acceleration in the horizontal plane,
    determining planar velocity taking into account the acceleration in the horizontal plane, a measured velocity of the vehicle, and a steering angle, wherein a first planar velocity is calculated by integration of the acceleration in the horizontal plane and is used in a closed feedback control circuit for the correction of the centrifugal force,
    performing a correction of the planar velocity change using values of the measured velocity, steering angle, pitch angle, roll angle, and the acceleration corrected by the centrifugal acceleration, wherein the corrected acceleration is corrected by the component of the change in the planar velocity,
    calculating the inclination of the vehicle body taking into account the rate of rotation and the gravitational acceleration of the vehicle, yielding a pitch angle and roll angle in relation to the inertial coordinate system, and
    determining the slope of the road using the inclination of the vehicle body.

2. The method according to claim 1, wherein the inclination of the vehicle body and the slope of the road are ascertained in dependence on at least one of a roll angle θ and a pitch angle θ.

3. The method according to claim 1, wherein the inclination of the chassis is ascertained by transformation of the distance oriented in the vertical direction between the at least one wheel and the vehicle body with the transformation matrix.

4. The method according to claim 1, wherein to ascertain the inclination of the vehicle body, a first body-fixed coordinate system is used, and to ascertain the inclination of the chassis, a second chassis-fixed coordinate system is used, and wherein a third inertial coordinate system is used as a reference coordinate system, which is related to the force of gravity.

5. The method according to claim 1, wherein a strapdown algorithm is used, with which it is provided that, for determining a corrected acceleration of the vehicle, a sensor-measured acceleration is corrected by a centrifugal acceleration and the gravitational acceleration and from this a speed of the vehicle is determined in a plane, and the inclination of the vehicle body is calculated.

6. The method according to claim 2, wherein a value of the roll angle $\phi_s$ is compared to a reference value in order to describe a slope of the road in the transverse direction, wherein it is determined that a steep curve is being traveled by the vehicle when the value is greater than the reference value.

7. A system for detecting the slope of a road on which a vehicle is traveling in at least one spatial direction, comprising:
a vehicle body and a chassis with a plurality of wheels, which are in contact with the road, wherein the system has a plurality of sensors and a control unit, wherein at least one first sensor is designed to determine an inclination of the vehicle body in the at least one spatial direction, wherein at least one second sensor is designed to detect, for at least one wheel, a vertical distance to the vehicle body, wherein the control unit is designed to calculate, via the at least one determined distance, an inclination of the chassis in the at least one spatial direction and to ascertain the slope of the road in the at least one spatial direction from a difference between the inclination of the vehicle body in the at least one spatial direction and the inclination of the chassis in the at least one spatial direction, wherein the inclination of the chassis in the at least one spatial direction is ascertained by transformation of the vertical distance between the at least one wheel and the vehicle body with a transformation matrix:

$$T = \begin{bmatrix} t_v & -t_v & t_h & -t_h \\ l_v & l_v & -l_h & -l_h \end{bmatrix}$$

whose elements are arranged in at least one column and at least one row, wherein values for the elements of the transformation matrix are dependent on lengths $t_v$, $t_h$, $l_v$, $l_h$ of the sides of at least one rectangle, wherein the center of gravity of the vehicle body is arranged at a first of two opposite corners of the at least one rectangle, and the at least one wheel is arranged at a second of the two opposite corners,
wherein a body-fixed coordinate system is used to ascertain the inclination of the vehicle body, a chassis-fixed coordinate system is used to ascertain the inclination of the vehicle chassis, and an inertial coordinate system is used as a reference coordinate system,
wherein the inclination of the vehicle body relative to the reference coordinate system is described by a quaternion, and
wherein a filter algorithm configured to merge computational methods is used to provide a signal usable both at low frequency and high frequency,
wherein sensor determined values are provided for acceleration and rate of rotation,
wherein a correction of the centrifugal force is performed and accelerations measured by the sensor layout are corrected by a component of the centrifugal force to determine a first corrected acceleration,
wherein a correction of the gravitational force is performed and the first corrected acceleration is corrected, taking into account roll angle and pitch angle, by the gravitational acceleration, resulting in acceleration in the horizontal plane,
wherein planar velocity is determined taking into account the acceleration in the horizontal plane, a measured velocity of the vehicle, and a steering angle, and wherein a first planar velocity is calculated by integration of the acceleration in the horizontal plane and is used in a closed feedback control circuit for the correction of the centrifugal force,
wherein a correction of a planar velocity change is performed using values of the measured velocity, steering angle, pitch angle, roll angle, and the acceleration corrected by the centrifugal acceleration, wherein the corrected acceleration is corrected by the component of the change in the planar velocity,
wherein the inclination of the vehicle body is calculated taking into account the rate of rotation and the gravitational acceleration of the vehicle, yielding a pitch angle and roll angle in relation to the inertial coordinate system, and
wherein the slope of the road is determined using the inclination of the vehicle body.

8. The system according to claim 7, wherein the at least one sensor is designed as a displacement sensor.

* * * * *